No. 760,478. PATENTED MAY 24, 1904.
W. F. OBERMILLER.
MIRROR AND SUPPORT THEREFOR.
APPLICATION FILED MAR. 24, 1903.
NO MODEL.
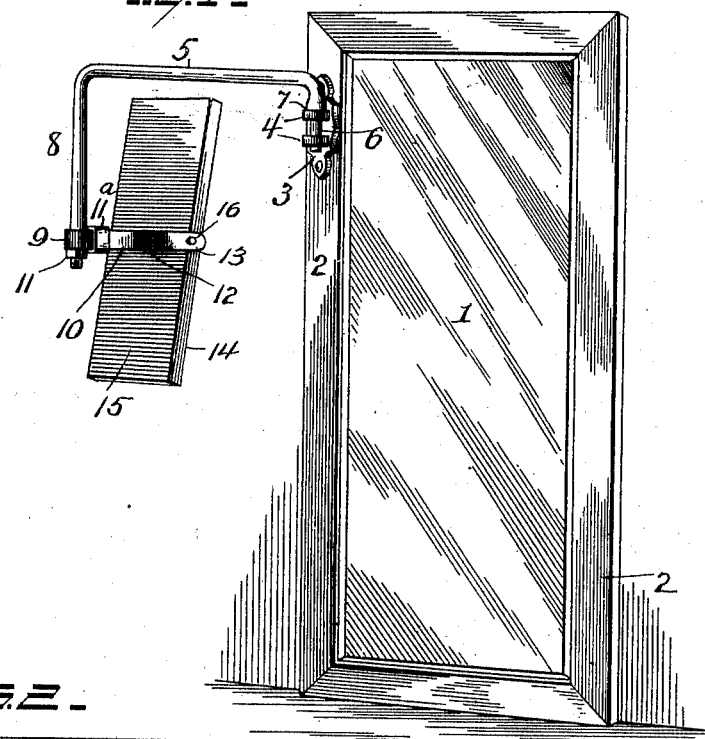
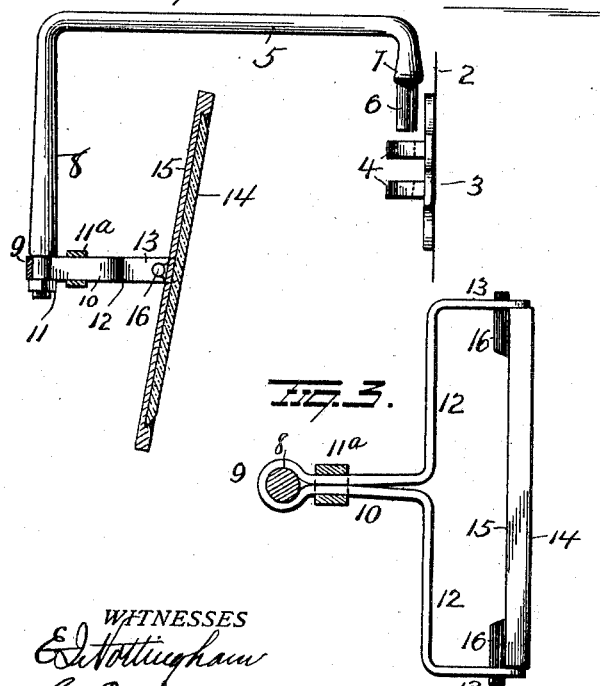
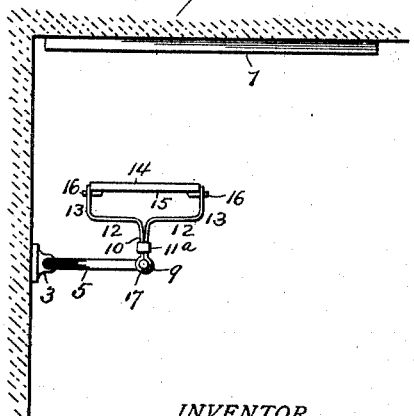
WITNESSES
INVENTOR
W. F. Obermiller
Attorney No. 760,478. Patented May 24, 1904.

UNITED STATES PATENT OFFICE.

WILLIAM F. OBERMILLER, OF GALENA, ILLINOIS, ASSIGNOR OF ONE-HALF TO HENRY L. OBERMILLER, OF GALENA, ILLINOIS.

MIRROR AND SUPPORT THEREFOR.

SPECIFICATION forming part of Letters Patent No. 760,478, dated May 24, 1904.

Application filed March 24, 1903. Serial No. 149,381. (No model.)

*To all whom it may concern:*

Be it known that I, WILLIAM F. OBERMILLER, a resident of Galena, in the county of Jo Daviess and State of Illinois, have invented certain new and useful Improvements in Mirrors and Supports Therefor; and I do hereby declare the following to be a full, clear, and exact description of the invention, such as will enable others skilled in the art to which it appertains to make and use the same.

My invention relates to an improvement in mirrors and supports therefor, the object of the invention being to so mount a small mirror in connection with a larger one as to permit of the easy adjustment of the smaller mirror to give to the user any view of himself desired and so construct this connecting mechanism as to insure the parts remaining in their position of adjustment.

With these objects in view the invention consists in certain novel features of construction and combinations and arrangements of parts, as will be more fully hereinafter described, and pointed out in the claim.

In the accompanying drawings, Figure 1 is a perspective view illustrating my improvements. Fig. 2 is a view of the parts detached. Fig. 3 is a view in horizontal section, and Fig. 4 is a view illustrating a modified form of bracket arm or rod.

1 represents the main mirror, supported in a suitable frame 2, to which a bracket 3 is secured and made with parallel ears 4, having alined openings to provide a bearing for a bracket arm or rod 5. This rod 5 is bent downward at right angles at two points between its ends, one end, 6, being shorter than the other and supported in the bracket 3 and having an annular shoulder 7 to limit its downward movement in the bearings. The outer or longer end 8 of rod 5 is contracted slightly to receive an eye 9 of a yoke 10, which will be more fully hereinafter described, and the lower end of the rod is screw-threaded for the reception of a nut 11 to secure the eye 9 thereon, but permit its rotary movement.

The yoke 10 comprises a flat strip or bar of spring metal bent midway between its ends, forming the eye 9. The ends then extend parallel for a short distance and are coupled by an adjusting ring or collar 11ª. The ends of the bar or strip are then bent at right angles, forming the laterally - projecting arms 12, which latter are again bent at right angles, forming fingers 13.

14 represents the adjustable mirror, supported in a metal frame or backing 15, provided at diametrically opposite sides with trunnions or lugs 16 to enter holes in the ends of fingers 13 and pivotally support the mirror 14 therein.

By constructing the yoke 10 of spring metal and of the shape described the fingers 13 bear against the sides of mirror 14 and considerable spring tension is exerted thereon to hold the mirror at any inclination by the frictional contact, the tension of the arms being regulated by the position of collar or ring 11ª, as will be readily understood.

Instead of employing the form of supporting arm or rod above described I might employ a rod such as shown in Fig. 4. In this form of rod an upwardly-projecting journal 17 is provided at the outer end to receive eye 9. With this latter form of rod I support it in a bracket secured to a support at right angles to the main mirror.

With my improvements the frictional contact of the yoke 10 with mirror 14 and rod 5 insures the retention of the mirror in any position and the wear of contacting parts is compensated for by the spring tension of the yoke.

Various slight changes might be made in the general form and arrangement of the parts described without departing from my invention, and hence I do not confine myself to the precise details set forth, but consider myself at liberty to make such slight changes and alterations as fairly fall within the spirit and scope of my invention.

Having fully described my invention, what I claim as new, and desire to secure by Letters Patent, is—

The combination with a bracket and an inverted-U-shaped rod, one depending member of said rod having a pivotal bearing in said bracket and the other depending member of said rod having a bearing for a clamp, of a spring-clamp made in a single piece bent between its ends to form an eye embracing the bearing at the lower end of one member of the U-shaped rod, said clamp bent outwardly from said eye to form radiating arms and then laterally and outwardly to form a yoke, a mirror mounted in said yoke and an adjustable collar on said radiating arms to cause the yoke to hold the mirror at any desired adjustment.

In testimony whereof I have signed this specification in the presence of two subscribing witnesses.

WILLIAM F. OBERMILLER.

Witnesses:
  WM. KLOTH,
  WILL B. CURLEY.